(12) United States Patent
Lee et al.

(10) Patent No.: US 12,221,194 B2
(45) Date of Patent: Feb. 11, 2025

(54) SOLAR BOAT FOR EASY COLLECTION OF SPILLED OIL AND GARBAGE

(71) Applicant: K-MARINE CO., LTD., Jeollabuk-do (KR)

(72) Inventors: Chan Woo Lee, Jeollabuk-do (KR); Wang Seon Lee, Jeollanam-do (KR); Byeong Yeong Mun, Jeollanam-do (KR); Yun Seo Cheon, Jeollabuk-do (KR)

(73) Assignee: K-MARINE CO., LTD. (KR)

( * ) Notice: Subject to any disclaimer, the term of this patent is extended or adjusted under 35 U.S.C. 154(b) by 358 days.

(21) Appl. No.: 17/895,155

(22) Filed: Aug. 25, 2022

(65) Prior Publication Data
US 2023/0202622 A1    Jun. 29, 2023

(30) Foreign Application Priority Data

Dec. 29, 2021    (KR) .................. 10-2021-0190781

(51) Int. Cl.
*B63B 35/32* (2006.01)
*B63B 35/44* (2006.01)
(Continued)

(52) U.S. Cl.
CPC .............. *B63B 35/32* (2013.01); *B63B 35/44* (2013.01); *C02F 1/001* (2013.01); *C02F 1/28* (2013.01);
(Continued)

(58) Field of Classification Search
CPC . B63B 35/32; B63B 35/44; B63B 2035/4453; B63B 25/002; B63B 25/08;
(Continued)

(56) References Cited

FOREIGN PATENT DOCUMENTS

| KR | 20030054151 A | * | 7/2003 | ............... B05B 1/02 |
| KR | 20080007303 A | * | 1/2008 | ............. B63B 35/32 |

(Continued)

*Primary Examiner* — Ekandra S. Miller-Cruz
(74) *Attorney, Agent, or Firm* — McDonald Hopkins LLC (57) ABSTRACT

A solar boat for easy collection of spilled oil and garbage of the present disclosure includes a cabin unit, a boat body consisting of a pair of ship bottoms having a structure that is symmetrical left and right and spaced apart below the cabin unit, a solar panel unit provided above the cabin unit and configured to convert solar energy into electrical energy, a collection and transfer unit provided between the pair of ship bottoms, driven by the electric energy supplied from the solar panel unit, and configured to collect spilled oil and garbage into the inside of the boat body, a garbage storage unit, and a spilled oil storage unit, wherein the collection and transfer unit comprises a rotating conveyor belt, and an oil adsorption member and a collection member that are attached to and detached from the conveyor belt, and the solar boat for easy collection of spilled oil and garbage of the present disclosure has an effect of having excellent work efficiency by simultaneously including an oil adsorption member and a collection member that are attached to and detached from a conveyor belt and simultaneously proceeding with collection of spilled oil and collection of garbage on the water, and an effect of being able to separate the spilled oil from the oil adsorption member, the collection member, and the garbage and easily move the spilled oil to the spilled oil storage unit by including a steam spray nozzle configured to spray hot steam at the end of the conveyor belt.

5 Claims, 7 Drawing Sheets (51) Int. Cl.
*C02F 1/00* (2023.01)
*C02F 1/28* (2023.01)
*C02F 1/40* (2023.01)
*C02F 103/00* (2006.01)
*C02F 103/08* (2006.01)
*E02B 15/04* (2006.01)
*E02B 15/10* (2006.01)
*H02S 20/30* (2014.01)
*H02S 40/10* (2014.01)

(52) U.S. Cl.
CPC .............. *C02F 1/40* (2013.01); *E02B 15/045* (2013.01); *E02B 15/048* (2013.01); *E02B 15/104* (2013.01); *H02S 20/30* (2014.12); *H02S 40/10* (2014.12); *B63B 2035/4453* (2013.01); *C02F 2103/007* (2013.01); *C02F 2103/08* (2013.01); *C02F 2201/008* (2013.01); *C02F 2201/009* (2013.01); *C02F 2209/05* (2013.01); *C02F 2303/16* (2013.01)

(58) Field of Classification Search
CPC ..... B63B 27/22; B63B 59/00; B63B 2209/20; C02F 1/001; C02F 1/28; C02F 1/40; C02F 2103/007; C02F 2103/08; C02F 2201/008; C02F 2201/009; C02F 2209/05; C02F 2303/16; E02B 15/045; E02B 15/048; E02B 15/104; E02B 15/046; H02S 20/30; H02S 40/10; H02S 20/20; Y02A 20/204; B65G 15/44
USPC .................................................... 210/170.09
See application file for complete search history.

(56) References Cited

FOREIGN PATENT DOCUMENTS

| | | | | |
|---|---|---|---|---|
| KR | 101213978 | | 12/2012 | |
| KR | 20190061685 | A * | 6/2019 | ............. B01D 17/02 |
| KR | 20200112315 | A * | 10/2020 | ............. B63B 1/121 |

\* cited by examiner

SOLAR BOAT FOR EASY COLLECTION OF SPILLED OIL AND GARBAGE

FIELD OF THE DISCLOSURE

The present disclosure relates to a solar boat for easy collection of spilled oil and garbage, and more specifically, to a solar boat for easy collection of spilled oil and garbage that can easily collect spilled oil and garbage on the water at the same time, can prevent marine and water pollution, and simultaneously minimize the waste of energy resources by including a rotating conveyor belt, and an oil adsorption member and a collection member that are attached to and detached from the conveyor belt in effectively collecting spilled oil and garbage from oceans, lakes, rivers, etc., by using a solar boat that converts solar energy into electrical energy and uses it.

BACKGROUND

Currently, for fossil fuels such as coal, petroleum, or the like required for energy production, carbon dioxide emitted by their use has been the main cause of global warming, and in addition, carbon monoxide, nitrogen oxides, sulfur oxides, etc., emitted from the combustion of fossil fuels have become the causes of damaging human health or resulting in acid rain that destroys forests. Furthermore, fossil fuels have limitations in their reserves, and there is also a more fundamental problem that they could soon be depleted due to their indiscriminate use by humankind.

In order to solve these problems, there is a need for the development of new technologies to reduce the risk of global warming by reducing the consumption of fossil fuels and to use natural energy that can replace fossil fuels. Natural energy alternatives to replace fossil fuels include solar power generation, wind power generation, hydroelectric power generation, etc. In particular, power generation using sunlight has received attention as it reduces greenhouse gases significantly and is superior to other natural energies in terms of energy efficiency.

In general, power generation using sunlight is a power generation method that directly converts light energy generated from the sun into electrical energy, and has the advantage of being able to generate electricity in a needed amount by installing necessary facilities where it is needed as sunlight, which is the energy source, is present everywhere on the earth and thus, there are no restrictions on the location.

Further, power generation using sunlight has advantages that it can be easily installed in various places as the period of building or constructing facilities is short, and can respond quickly to temporary increases in demand, maintenance of the facilities using sunlight is easy, and the consumption of human resources can be minimized.

Such solar power generation can be integrated into various fields, and recently, even solar boats too have emerged that perform solar power generation by using solar panels and that move on water using it as power. A solar boat is a boat designed to supply electricity to the solar boat with the electric power produced from sunlight using the solar panels installed on the roof of the boat or to use it later by storing the excess in a storage battery. Such solar boats have the advantage of being environmentally friendly and not causing marine pollution as they do not emit pollutants. Recently, solar boats for garbage collection that collect garbage on the water by using solar boats with excellent environmental friendliness have been developed. Such solar boats for garbage collection have the advantage of solving the problem that existing garbage collection boats cause further marine pollution while collecting garbage on the water.

In general, the garbage on the water includes household waste that flows into the seas, lakes, rivers, etc., from the land, fishery waste produced from fish farms, ships, and the like, etc. Such garbage floats on the seas, lakes, and rivers depending on its material, damaging the ecosystems of the seas, lakes, and rivers. Accordingly, it is necessary to collect the garbage on the water, transport it to the land waste processing plant, and process it, but there is a problem that it takes a lot of labor and incurs excessive costs to collect the garbage on the water. Furthermore, if spilled oil is collected using existing vessels for oil-spill cleanup operated using internal combustion engines in the event of an oil spill accident, there may arise a problem that boats for collecting spilled oil operated by internal combustion engines cause further marine pollution while collecting the oil spilled on the water. In addition, since vessels for oil-spill cleanup operated using internal combustion engines are used separately from garbage collection vessels, there may arise a problem of incurring the costs dually in collecting the spilled oil on the water. Moreover, there may arise a problem that the garbage on water interferes with the collection of the spilled oil in the process of collecting the spilled oil by using existing vessels for oil-spill cleanup operated using internal combustion engines in the event of an oil spill accident.

As prior art for solving such a problem of garbage on water, Korean Patent No. 10-1213978 (Patent Document 1) has been disclosed.

Patent Document 1 relates to a marine garbage gathering place, and relates to technology including a railing part installed in a buoyancy part, provided along the outer periphery of an upper plate part on which objects to be gathered are loaded, and having at least a portion thereof opened, and a door part installed in an open portion of the railing part, wherein the railing part includes pillars arranged along the outer periphery of the upper plate part, a first stage rail including unit rails formed in the form of a rectangular plate and connected to each other and supported at the lower part of the pillars, and a second stage rail formed in the form of a pipe, positioned above the first stage rail, and connected to the upper part of the pillars.

However, since the prior art for solving the conventional problem of garbage on water, including Patent Document 1, proceeds with collecting the garbage on the water by mobilizing human labor, there still remains a problem that it takes a lot of labor and incurs excessive costs to collect the garbage on the water, and there still persist a problem that boats for collecting spilled oil operated by internal combustion engines cause further marine pollution while collecting the oil spilled on the water, a problem of incurring the costs dually in collecting the spilled oil on the water as vessels for oil-spill cleanup are operated separately from garbage collection vessels, and a problem that the garbage on the water interferes with the collection of the spilled oil in the process of collecting the spilled oil by using vessels for oil-spill cleanup.

PRIOR ART LITERATURE

Patent Documents (Patent Document 1) Registered Korean Patent No. 10-1213978 (Date: Dec. 20, 2012)

SUMMARY OF THE DISCLOSURE

Technical Objects

In resolving the problems described above, it is an object of the present disclosure to provide a solar boat for easy collection of spilled oil and garbage with excellent work efficiency by simultaneously including an oil adsorption member and a collection member that are attached to and detached from a conveyor belt and simultaneously proceeding with collection of spilled oil and collection of garbage on the water.

In addition, it is an object of the present disclosure to provide a solar boat for easy collection of spilled oil and garbage that makes it easy to separate collected spilled oil and garbage by having a garbage storage unit, which has a plurality of through holes of a certain size formed in the bottom thereof and performs the function that the spilled oil falls downward and moves to the spilled oil storage unit and the garbage is filtered out, formed at the end of the conveyor belt.

Further, it is an object of the present disclosure to provide a solar boat for easy collection of spilled oil and garbage that can separate the spilled oil from the oil adsorption member, the collection member, and the garbage and easily move the spilled oil to the spilled oil storage unit by including a steam spray nozzle configured to spray hot steam at the end of the conveyor belt.

Moreover, it is an object of the present disclosure to provide a solar boat for easy collection of spilled oil and garbage that can separate the spilled oil efficiently and economically by spraying hot steam heated by a heating unit onto the oil adsorption member, the collection member, and the garbage through the steam spray nozzle, by further including a water inlet for introducing water at the front side of a pair of ship bottoms, and by further including a filtration unit for removing impurities from the water introduced during operation through the water inlet and the heating unit for heating the water from which impurities have been removed.

Furthermore, it is an object of the present disclosure to provide a solar boat for easy collection of spilled oil and garbage that can easily collect garbage on the water by forming the collection member using a structure in which a plurality of attachable and detachable garbage-collecting hooks that has a pointed end and that is curved in the rotational direction of the conveyor belt is arranged left and right at constant intervals longitudinally on the rotating conveyor belt and the oil adsorption member attached to and detached from the conveyor belt.

Technical Solution

A solar boat for easy collection of spilled oil and garbage that can easily collect garbage on the water in accordance with an embodiment of the present disclosure may include a cabin unit, a boat body consisting of a pair of ship bottoms having a structure that is symmetrical left and right and spaced apart below the cabin unit, a solar panel unit provided above the cabin unit and configured to convert solar energy into electrical energy, a collection and transfer unit provided between the pair of ship bottoms, driven by the electric energy supplied from the solar panel unit, and configured to collect spilled oil and garbage into the inside of the boat body, a garbage storage unit, and a spilled oil storage unit, wherein the collection and transfer unit may include a rotating conveyor belt, and an oil adsorption member and a collection member that are attached to and detached from the conveyor belt.

In this case, in the solar boat for easy collection of spilled oil and garbage in accordance with an embodiment of the present disclosure, wherein the garbage storage unit may be formed at an end of the conveyor belt and have a plurality of through holes of a certain size formed in a bottom thereof, thereby performing a function that the spilled oil falls downward and moves to the spilled oil storage unit and the garbage is filtered out.

Further, in the solar boat for easy collection of spilled oil and garbage in accordance with an embodiment of the present disclosure, wherein the end of the conveyor belt may further include a steam spray nozzle configured to separate the spilled oil from the oil adsorption member, the collection member, and the garbage by spraying hot steam, and to move the spilled oil to the spilled oil storage unit.

In this case, in the solar boat for easy collection of spilled oil and garbage in accordance with an embodiment of the present disclosure, wherein a front side of the pair of ship bottoms may further include a water inlet configured to introduce water, the inside of the pair of ship bottoms may further include a filtration unit configured to remove impurities from the water introduced during operation through the water inlet and a heating unit configured to heat the water from which impurities have been removed, and hot steam heated by the heating unit may be ejected onto the oil adsorption member, the collection member, and the garbage through the steam spray nozzle, thereby performing a role of separating the spilled oil and moving it to the spilled oil storage unit.

In addition, in the solar boat for easy collection of spilled oil and garbage in accordance with an embodiment of the present disclosure, wherein the filtration unit may further include a salinity measurement unit configured to measure the salinity of the water from which impurities have been removed and a salinity adjustment unit configured to adjust the salinity of the water from which impurities have been removed.

In this case, the solar boat for easy collection of spilled oil and garbage in accordance with an embodiment of the present disclosure may further include a solar panel cleaning unit configured to proceed with a cleaning operation on the solar panel unit using the water whose salinity has been adjusted by the salinity adjustment unit.

Moreover, in the solar boat for easy collection of spilled oil and garbage in accordance with an embodiment of the present disclosure, wherein the collection member may have a structure in which a plurality of attachable and detachable garbage-collecting hooks that has a pointed end and that is curved in a rotational direction of the conveyor belt is arranged left and right at constant intervals longitudinally on the rotating conveyor belt and the oil adsorption member attached to and detached from the conveyor belt.

In this case, the solar boat for easy collection of spilled oil and garbage in accordance with an embodiment of the present disclosure may further include a garbage size sensing unit, so that the height and spacing of the plurality of garbage-collecting hooks protruding to the outside can be adjusted according to the size of the garbage sensed by the garbage size sensing unit.

Effects of the Disclosure

As described above, the solar boat for easy collection of spilled oil and garbage in accordance with the present disclosure has an effect of having excellent work efficiency by simultaneously including an oil adsorption member and a collection member that are attached to and detached from a conveyor belt and simultaneously proceeding with collection of spilled oil and collection of garbage on the water.

In addition, the solar boat for easy collection of spilled oil and garbage in accordance with the present disclosure has an effect of making it easy to separate collected spilled oil and garbage by having a garbage storage unit, which has a plurality of through holes of a certain size formed in the bottom thereof and performs the function that the spilled oil falls downward and moves to the spilled oil storage unit and the garbage is filtered out, formed at the end of the conveyor belt.

Further, the solar boat for easy collection of spilled oil and garbage in accordance with the present disclosure has an effect of being able to separate the spilled oil from the oil adsorption member, the collection member, and the garbage and easily move the spilled oil to the spilled oil storage unit by including a steam spray nozzle configured to spray hot steam at the end of the conveyor belt.

Moreover, the solar boat for easy collection of spilled oil and garbage in accordance with the present disclosure has an effect of being able to separate the spilled oil efficiently and economically by spraying hot steam heated by a heating unit onto the oil adsorption member, the collection member, and the garbage through the steam spray nozzle, by further including a water inlet for introducing water at the front side of a pair of ship bottoms, and by further including a filtration unit for removing impurities from the water introduced during operation through the water inlet and the heating unit for heating the water from which impurities have been removed.

Furthermore, the solar boat for easy collection of spilled oil and garbage in accordance with the present disclosure has an effect of being able to easily collect garbage on the water by forming the collection member using a structure in which a plurality of attachable and detachable garbage-collecting hooks that has a pointed end and that is curved in the rotational direction of the conveyor belt is arranged left and right at constant intervals longitudinally on the rotating conveyor belt and the oil adsorption member attached to and detached from the conveyor belt.

DETAILED DESCRIPTION OF THE PREFERRED EMBODIMENTS

In the present disclosure, the accompanying drawings may be illustrated in an exaggerated representation for the convenience of understanding the technology, as well as for differentiation and clarity from the prior art. In addition, since the terms to be described below are terms defined in consideration of the functions in the present disclosure and may vary depending on the intention of a user or operator or custom, definitions of these terms should be made individually based on the technical contents throughout this specification. On the other hand, the embodiments are merely illustrative matters of the components presented in the claims of the present disclosure and do not limit the scope of the present disclosure, and the scope of rights should be construed based on the technical idea throughout the specification of the present disclosure.

Further, before describing the present disclosure, it should be noted that matters that are not necessary to disclose the subject matter of the present disclosure, i.e., known configurations that can be added unambiguously by those of ordinary skill in the art, are not shown or specifically described.

Figure 1:
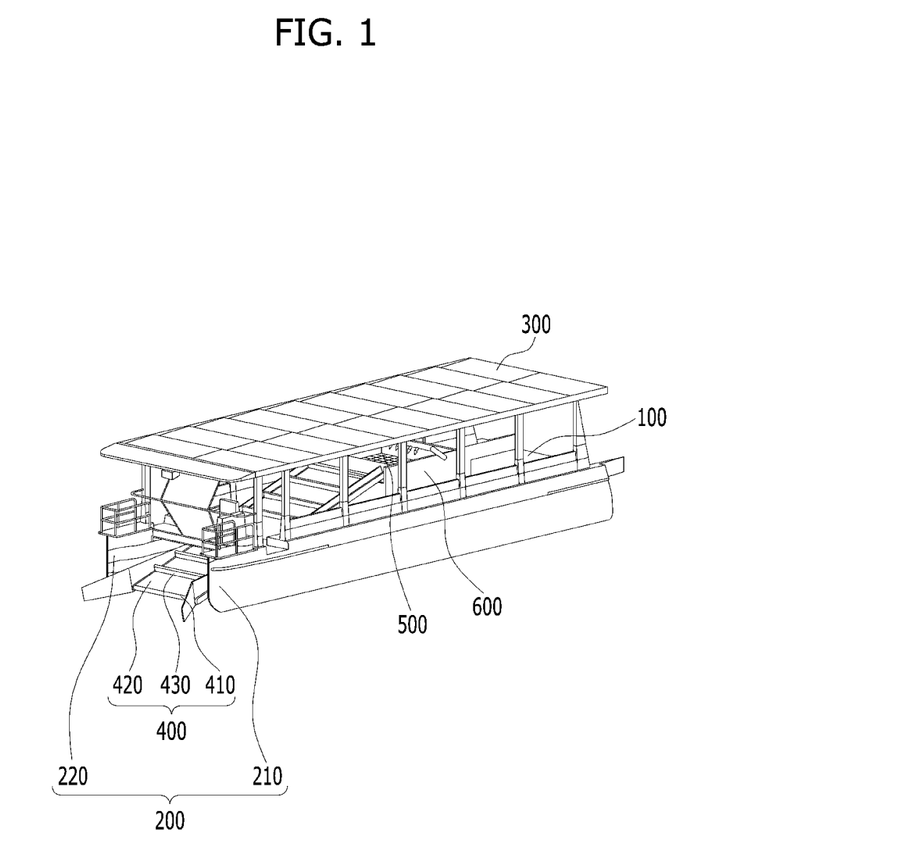
FIG. 1 is a diagram showing the configuration of a solar boat for easy collection of spilled oil and garbage in accordance with one embodiment of the present disclosure.

FIG. 1 is a diagram showing the configuration of a solar boat for easy collection of spilled oil and garbage in accordance with one embodiment of the present disclosure.

According to FIG. 1, the solar boat for easy collection of spilled oil and garbage in accordance with one embodiment of the present disclosure may include a cabin unit 100, a boat body 200 consisting of a pair of ship bottoms 210 and 220 having a structure that is symmetrical left and right and spaced apart below the cabin unit 100, a solar panel unit 300 provided above the cabin unit 100 and configured to convert solar energy into electrical energy, a collection and transfer unit 400 provided between the pair of ship bottoms 210 and 220, driven by the electric energy supplied from the solar panel unit 300, and configured to collect spilled oil and garbage into the inside of the boat body 200, a garbage storage unit 500, and a spilled oil storage unit 600, wherein the collection and transfer unit 400 may include a rotating conveyor belt 410, and an oil adsorption member 420 and a collection member 430 that are attached to and detached from the conveyor belt 410.

The cabin unit 100 may include a driver's seat (not shown) and a working space part (not shown) in which garbage sorting is performed. The boat body 200 consisting of the pair of ship bottoms 210 and 220 provided symmetrically left and right and provided spaced apart from each other with respect to the central part may be located below the cabin unit 100, and the boat body 200 may include a drive unit (not shown) and a battery unit (not shown) at the stern portion. The solar panel unit 300 configured to convert solar energy into electrical energy may be positioned above the cabin unit 100, the electricity produced by the solar panel unit 300 may be stored in the battery unit included in the ship bottoms 210 and 220, the electricity stored in the battery unit may operate the drive unit, and may operate the collection and transfer unit 400 to be described below. The collection and transfer unit 400 driven by the electric energy, which is produced by the solar panel unit 300, is stored in the battery unit, and then is supplied, is located between the pair of ship bottoms 210 and 220, and the collection and transfer unit 400 functions to adsorb spilled oil and pick up garbage on the water, and collect it inside the boat body 200. In this case, the collection and transfer unit 400 may include the detachable oil adsorption member 420 on the rotating conveyor belt 410 so that spilled oil can be easily adsorbed, and may include the collection member 430 in the shape of a bowl so that the spilled oil and the garbage on the water can be picked up and collected more easily. As the collection member 430 has a bowl shape, it is possible to perform the function of easily scooping up the spilled oil together with water, and it is possible to perform the function of easily picking up garbage on the water. In this case, the collection member 430 is not particularly limited in its shape or material as long as it is possible to perform the function of easily scooping up spilled oil together with water and perform the function of easily picking up the garbage on the water. The conveyor belt 410 may have an inclined structure with a lower front side, which is the driving direction of the solar boat, and a higher rear side, and may, in some cases, have a reverse inclined structure with a higher front side and a lower rear side, a horizontal structure with the same height for the front and the rear sides, etc. As the conveyor belt 410 has a structure having an inclination with a lower front side and a higher rear side in the driving direction of the solar boat, spilled oil or garbage on the water that approaches the front side during the operation of the solar boat can easily climb up the lower front side of the conveyor belt 410, the spilled oil is easily adsorbed by the oil adsorption member 420) attached to the conveyor belt 410 and the spilled oil is easily scooped up by the collection member 430, and thus, the spilled oil can be easily collected inside of the boat body 200, and the garbage on the water can be easily caught in the bowl-shaped collection member 430 formed on the conveyor belt 410, so that the garbage on the water can be easily collected inside of the boat body 200. That is, as a result, the spilled oil adsorbed onto the oil adsorption member 420, the spilled oil scooped up by the bowl-shaped collection member 430, and the garbage caught in the bowl-shaped collection member 430 move to the higher rear side of the conveyor belt 410 by the rotation of the conveyor belt 410. The spilled oil adsorbed onto the oil adsorption member 420 that has moved to the higher rear side of the conveyor belt 410 is separated from the oil adsorption member 420 and moved to the spilled oil storage unit 600. At this time, the spilled oil may be separated from the oil adsorption member 420 in such a way of passing air or water from the inside to the outside in the oil adsorption member 420 attached to the higher rear side of the conveyor belt 410, and may be stored in the spilled oil storage unit 600. In addition, the spilled oil scooped up by the bowl-shaped collection member 430 formed on the higher rear side of the conveyor belt 410 may be separated from the collection member 430 in such a way that the spilled oil drops by gravity, and may be stored in the spilled oil storage unit 600. In this case, it is also possible for the spilled oil scooped up by the bowl-shaped collection member 430 to be separated from the collection member 430 in such a way of being washed away by air or water and to be stored in the spilled oil storage unit 600. In addition, the garbage caught in the bowl-shaped collection member 430 formed on the higher rear side of the conveyor belt 410 may be separated from the collection member 430 in such a way that the garbage drops by gravity, and may be stored in the garbage storage unit 500. At this time, only the garbage is caught and stored in the garbage storage unit 500, and the spilled oil separated from the oil adsorption member 420, the collection member 430, or the garbage passes through the garbage storage unit 500 and is stored in the spilled oil storage unit 600 located below: In this case, the oil adsorption member 420 is not particularly limited in its material as long as it is attachable to and detachable from the conveyor belt 410 and performs the function of adsorbing spilled oil, and may have a material such as paper, nonwoven fabric, fiber, synthetic resin, or the like. Also, in the case of the collection member 430 as well, there are no particular limitations on its shape or material as long as it performs the function of scooping up the spilled oil and catching the garbage on the water and moving it onto the conveyor belt 410.

According to FIG. 1, the garbage storage unit 500 may be formed at the end of the conveyor belt 410 and have a plurality of through holes of a certain size formed in the bottom thereof, and may perform the function that the spilled oil falls downward and moves to the spilled oil storage unit 600 and the garbage is filtered out. In this case, the garbage storage unit 500 may have a wire mesh shape in which a plurality of through holes of a certain size is formed, and large-sized garbage may be filtered out by and stored in the wire mesh-shaped garbage storage unit 500, and small-sized spilled oil may pass through the plurality of through-holes of the wire mesh-shaped garbage storage unit 500 and drop into the spilled oil storage unit 600 below and be stored therein.

Figure 2:
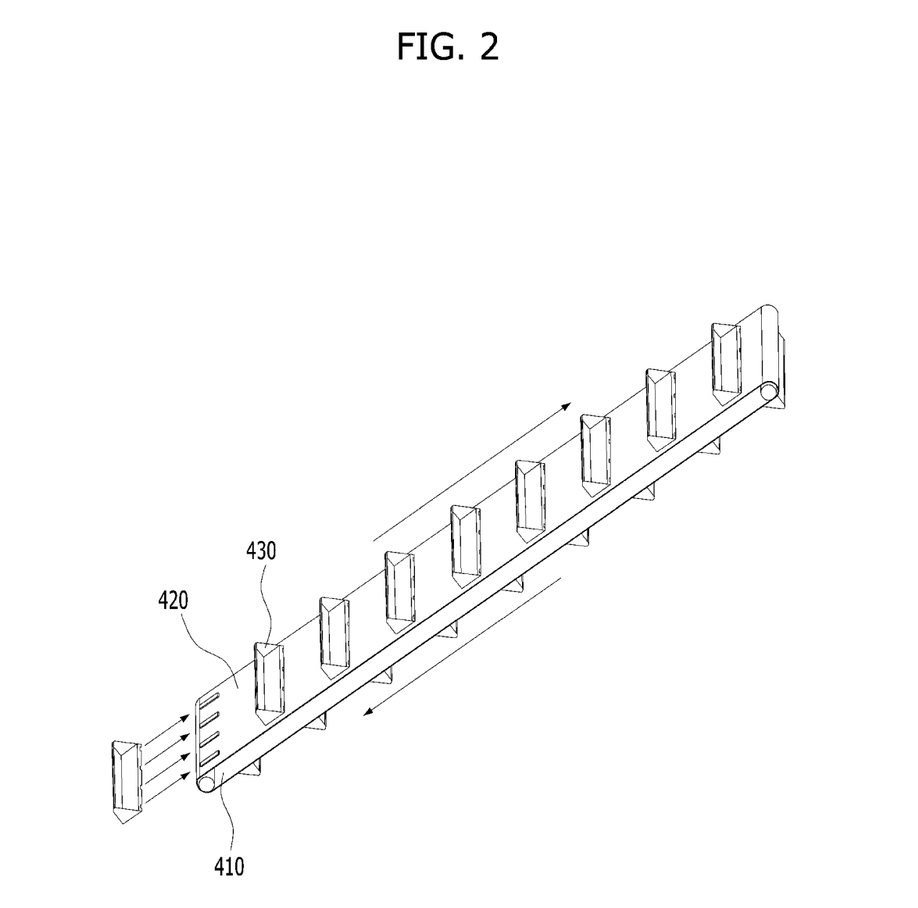
FIG. 2 is a diagram showing the figure in which a collection member has a bowl shape and is detachable and attachable in a solar boat for easy collection of spilled oil and garbage in accordance with one embodiment of the present disclosure.

FIG. 2 is a diagram showing the figure in which a collection member has a bowl shape and is detachable and attachable in a solar boat for easy collection of spilled oil and garbage in accordance with one embodiment of the present disclosure.

According to FIG. 2, as the collection member in the solar boat for easy collection of spilled oil and garbage in accordance with one embodiment of the present disclosure has a bowl shape, it is possible to easily collect the spilled oil by scooping up the spilled oil together with water, and since it is possible to easily pick up garbage on the water, it has a feature of being able to easily collect garbage on the water. In addition, as the bowl-shaped collection member can be easily attached to and detached from the conveyor belt 410, it has the feature of being able to replace and use various shapes of collection members 430 according to the surrounding environments such as the degree of an oil spill or the type of garbage. For example, if an emphasis is put on the collection of garbage on the water rather than the collection of spilled oil, the collection member 430 may have a structure in which a plurality of garbage-collecting hooks that has a pointed end and that is curved in the rotational direction of the conveyor belt 410 is arranged left and right at constant intervals longitudinally on the rotating conveyor belt 410 and the oil adsorption member 420 attached to and detached from the conveyor belt.

Figure 3:
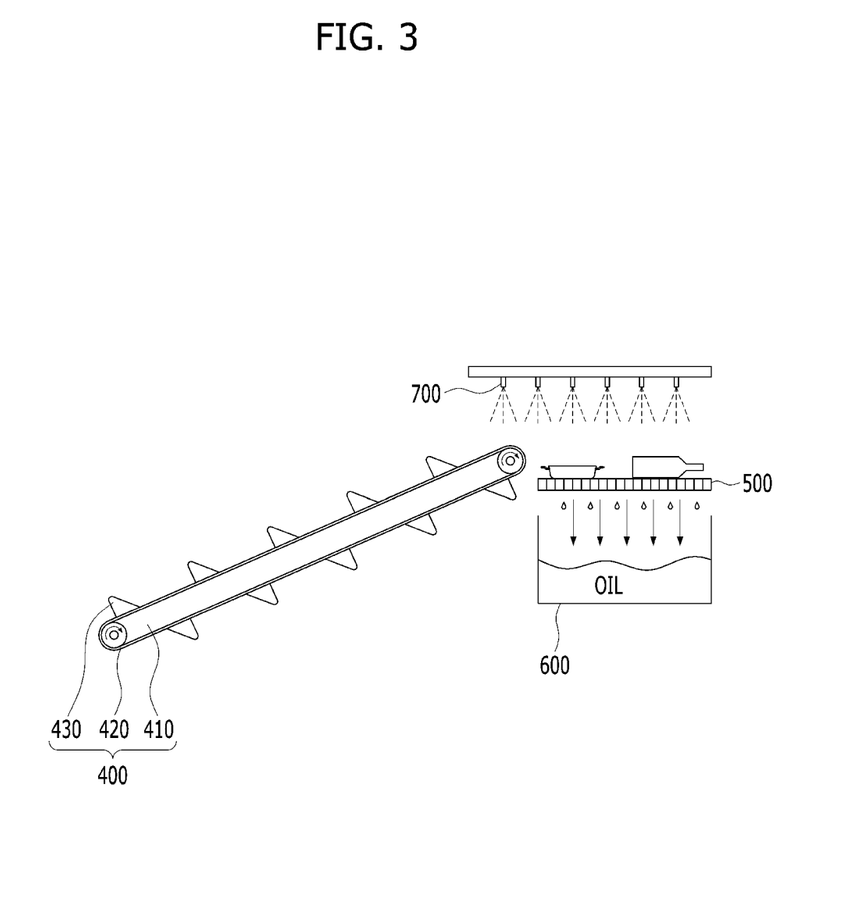
FIG. 3 is a diagram showing the configuration of a rotating conveyor belt, a collection and transfer unit including an oil adsorption member and a collection member that are attached to and detached from the conveyor belt, a garbage storage unit, a spilled oil storage unit, and a steam spray nozzle of a solar boat for easy collection of spilled oil and garbage in accordance with one embodiment of the present disclosure.

FIG. 3 is a diagram showing the configuration of a rotating conveyor belt, a collection and transfer unit including an oil adsorption member and a collection member that are attached to and detached from the conveyor belt, a garbage storage unit, a spilled oil storage unit, and a steam spray nozzle of a solar boat for easy collection of spilled oil and garbage in accordance with one embodiment of the present disclosure.

According to FIG. 3, the end of the conveyor belt 410 in the solar boat for easy collection of spilled oil and garbage in accordance with one embodiment of the present disclosure may further include a steam spray nozzle 700 configured to separate the spilled oil from the oil adsorption member 420, the collection member 430, and the garbage by spraying hot steam, and to move the spilled oil to the spilled oil storage unit 600. As hot steam is sprayed from the steam spray nozzle 700 to the oil absorption member 420 at the end of the conveyor belt 410, the spilled oil adsorbed onto the oil absorption member 420 can be separated, and as hot steam is sprayed from the steam spray nozzle 700 to the collection member 430 at the end of the conveyor belt 410, the spilled oil that has been scooped up by the collection member 430 can be separated. Furthermore, as hot steam is sprayed from the steam spray nozzle 700 to the garbage having the spilled oil adhered thereto, the spilled oil adhered to the garbage may be separated. The spilled oil separated from the oil adsorption member 420, the collection member 430, and the garbage by the hot steam spray passes through the garbage storage unit 500 by gravity and falls into the spilled oil storage unit 600, where it is stored.

Figure 4:
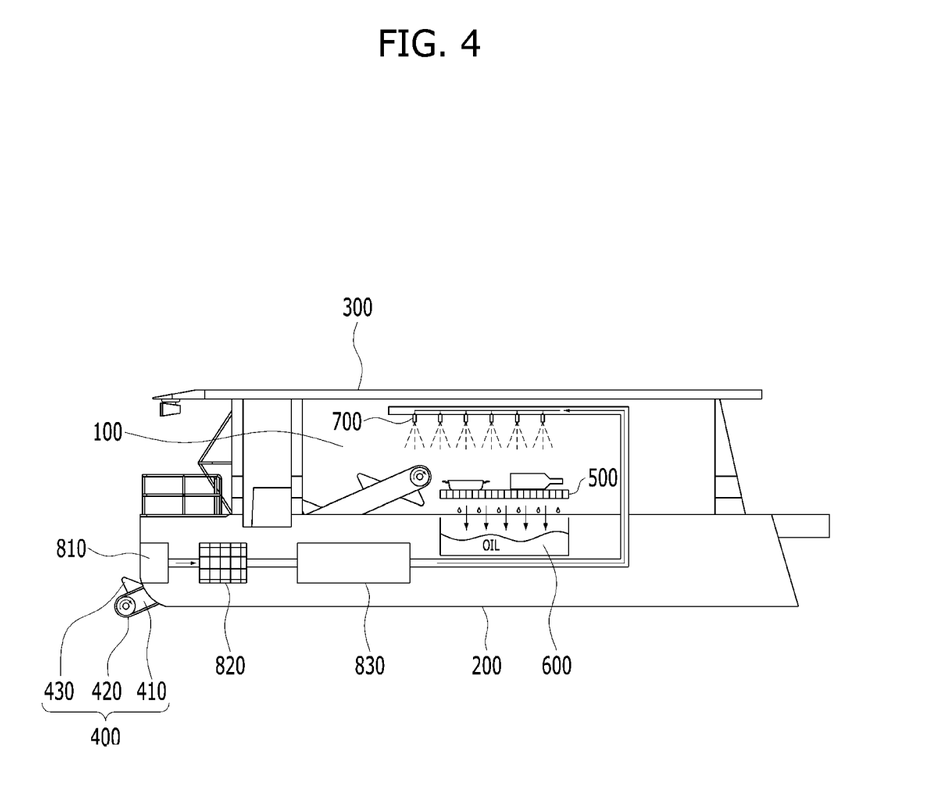
FIG. 4 is a diagram showing that a solar boat for easy collection of spilled oil and garbage in accordance with one embodiment of the present disclosure further includes a water inlet, a filtration unit, and a heating unit, so that the hot steam heated by the heating unit is ejected to the oil adsorption member, collection member, and garbage through the steam spray nozzle, thereby performing the role of separating the spilled oil and moving it to the spilled oil storage unit.

FIG. 4 is a diagram showing that a solar boat for easy collection of spilled oil and garbage in accordance with one embodiment of the present disclosure further includes a water inlet, a filtration unit, and a heating unit, so that the hot steam heated by the heating unit is ejected to the oil adsorption member, collection member, and garbage through the steam spray nozzle, thereby performing the role of separating the spilled oil and moving it to the spilled oil storage unit.

According to FIG. 4, the front side of the pair of ship bottoms 210 and 220 in the solar boat for easy collection of spilled oil and garbage in accordance with one embodiment of the present disclosure may further include a water inlet 810 for introducing water, and the inside of the pair of ship bottoms 210 and 220 may further include a filtration unit 820 for removing impurities from the water introduced during operation through the water inlet 810 and a heating unit 830 for heating the water from which impurities have been removed. In this case, the hot steam heated by the heating unit 830 is ejected to the oil adsorption member 420, the collection member 430, and the garbage through the steam spray nozzle 700, and separates the spilled oil adsorbed onto the oil adsorption member 420, the collection member 430, and the garbage, and the spilled oil separated from the oil adsorption member 420, the collection member 430, and the garbage passes through the garbage storage unit 500 by gravity and falls into the spilled oil storage unit 600, where it is stored.

In the solar boat for easy collection of spilled oil and garbage in accordance with one embodiment of the present disclosure, the water inlet 810 may be arranged on the front side of the solar boat. By having the water inlet 810 arranged on the front side of the solar boat, seawater or fresh water can flow into the solar boat through the water inlet 810 during operation of the solar boat without a separate suction apparatus. There is no particular limitation on the shape of the water inlet 810. The solar boat for easy collection of spilled oil and garbage in accordance with an embodiment of the present disclosure may include the filtration unit 820 for removing impurities from the water that flows into the solar boat through the water inlet 810 during operation. The solar boat for easy collection of spilled oil and garbage in accordance with an embodiment of the present disclosure may be operated in various areas, and may also be operated in an area where a lot of impurities are present due to severe pollution. In the case of operating in an area where a lot of impurities are present due to severe pollution, if the filtration unit 820 is not present, contaminated hot steam may be sprayed onto the oil adsorption member 420 and the garbage through the steam spray nozzle 700 to thereby contaminate the oil adsorption member 420 and the garbage, causing a problem of deteriorating the adsorption performance of the oil adsorption member 420. In some cases, the filtration unit 820 may include a particle size sensing apparatus to identify the particle size of impurities present in the water introduced into the solar boat through the water inlet 810 and to provide customized filtration. Customized filtration according to the particle size of impurities may be provided in the manner of increasing the particle size that can pass through the filtration unit 820 if the particle size of the impurities is large, and decreasing the particle size that can pass through the filtration unit 820 if the particle size of the impurities is small. Through this customized filtration, the velocity of water passing through the filtration unit 820 can be adjusted, and the filtration efficiency can be properly maintained. The solar boat for easy collection of spilled oil and garbage in accordance with an embodiment of the present disclosure should include the heating unit 830 for heating the water from which impurities have been removed. By having a temperature over 100 degrees C. by the heating unit 830, the water undergoes a phase change to hot steam, which may be ejected to the oil adsorption member 420, the collection member 430, and the garbage through the steam spray nozzle 700, and can separate the spilled oil adsorbed onto the oil adsorption member 420, the collection member 430, and the garbage.

Figure 5:
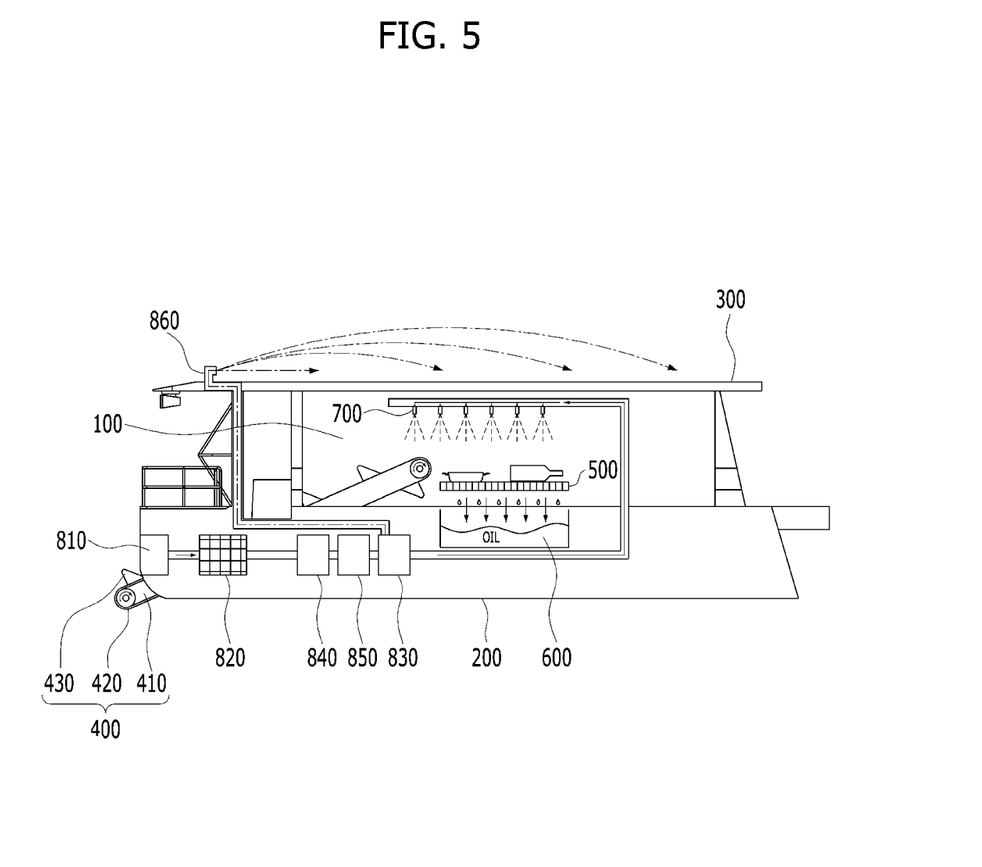
FIG. 5 is a diagram showing that a solar boat for easy collection of spilled oil and garbage in accordance with one embodiment of the present disclosure further includes a water inlet, a filtration unit, a salinity measurement unit, a salinity adjustment unit, and a heating unit, so that the hot steam whose salinity has been adjusted by the salinity adjustment unit and that is heated by the heating unit is ejected to the oil adsorption member, the collection member, and the garbage through the steam spray nozzle, thereby performing the role of separating the spilled oil and moving it to the spilled oil storage unit, and performing the role of proceeding with a cleaning operation on the solar panel through a solar cleaning unit.

FIG. 5 is a diagram showing that a solar boat for easy collection of spilled oil and garbage in accordance with one embodiment of the present disclosure further includes a water inlet, a filtration unit, a salinity measurement unit, a salinity adjustment unit, and a heating unit, so that the hot steam whose salinity has been adjusted by the salinity adjustment unit and that is heated by the heating unit is ejected to the oil adsorption member, the collection member, and the garbage through the steam spray nozzle, thereby performing the role of separating the spilled oil and moving it to the spilled oil storage unit, and performing the role of proceeding with a cleaning operation on the solar panel through a solar cleaning unit.

According to FIG. 5, the filtration unit 820 in the solar boat for easy collection of spilled oil and garbage in accordance with one embodiment of the present disclosure may further include a salinity measurement unit 840 for measuring the salinity of the water from which impurities have been removed and a salinity adjustment unit 850 for adjusting the salinity of the water from which impurities have been removed. If the solar boat operates on the sea or in a river close to the sea, salt (NaCl) may be present in the water introduced into the inside of the solar boat through the water inlet 810 of the solar boat, and if the water containing salt (NaCl) is heated, corrosion is highly likely to occur in the heating unit 830. In order to solve this problem, the salinity measurement unit 840 measures the salinity of the water from which impurities have been removed, and the salinity adjustment unit 850 adjusts the salinity of the water from which impurities have been removed, thereby solving the problem of the heating unit 840 being corroded by salt (NaCl). There is no particular limitation on the type of the salinity measurement unit 840, and any apparatus capable of measuring the salinity of the water that has flowed into the inside of the solar boat and from which impurities have been removed may correspond to the salinity measurement unit 840. In addition, there is no particular limitation on the type of the salinity adjustment unit 850 as well, and any apparatus capable of adjusting the salinity of the water that has flowed into the inside of the solar boat and from which impurities have been removed may correspond to the salinity adjustment unit 850.

According to FIG. 5, the solar boat for easy collection of spilled oil and garbage in accordance with one embodiment of the present disclosure may further include a solar panel cleaning unit 860 configured to proceed with a cleaning operation on the solar panel unit 300 using the water whose salinity has been adjusted by the salinity adjustment unit 850. By applying pressure by the solar panel cleaning unit 860 using the water whose salinity has been adjusted by the salinity adjustment unit 850, and having pressurized high-pressure water (5-200 bars) sprayed onto the solar panel 300, cleaning of the solar panel 300 can be performed. In this case, the solar panel cleaning unit 860 is attached to the front surface of the solar panel 300, and directly or indirectly sprays water at a pressure of 5 to 200 bars from the front surface to the rear surface of the solar panel 300, thereby performing the cleaning of the solar panel 300.

Figure 6:
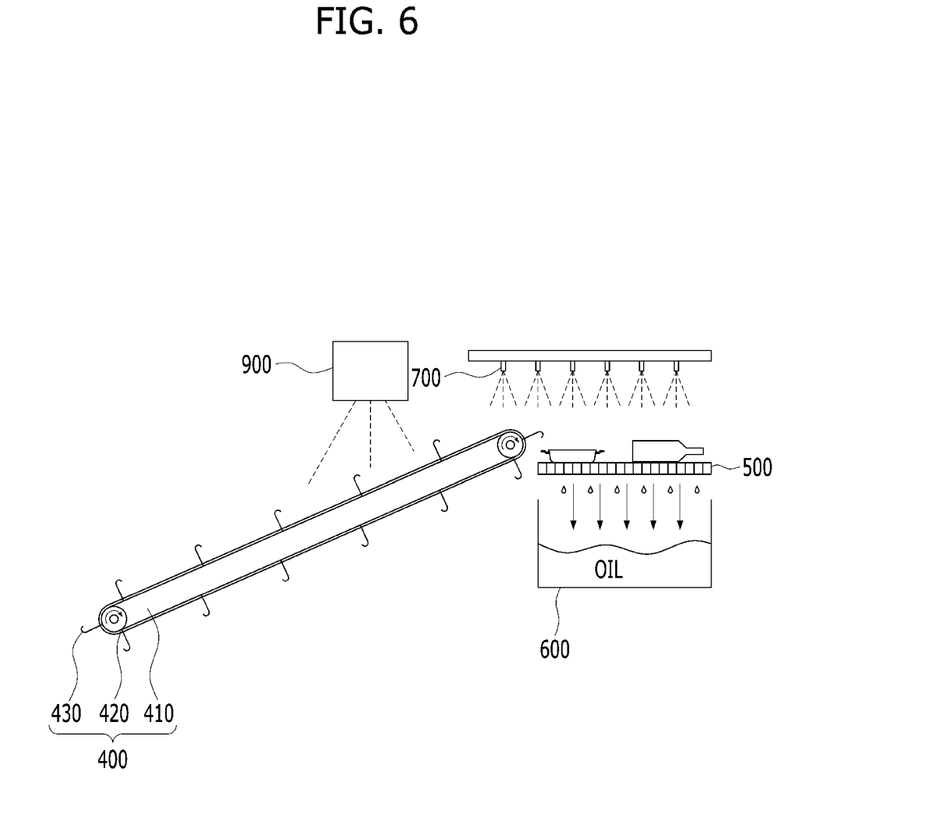
FIG. 6 is a diagram showing the figure in which the collection member has a structure in which a plurality of attachable and detachable garbage-collecting hooks that has a pointed end and that is curved in the rotational direction of the conveyor belt is arranged left and right at constant intervals longitudinally on the rotating conveyor belt and the oil adsorption member attached to and detached from the conveyor belt, and the figure of further including a garbage size sensing unit capable of adjusting the height and spacing of the plurality of garbage-collecting hooks protruding to the outside according to the size of the garbage, in a solar boat for easy collection of spilled oil and garbage in accordance with one embodiment of the present disclosure.

FIG. 6 is a diagram showing the figure in which the collection member has a structure in which a plurality of attachable and detachable garbage-collecting hooks that has a pointed end and that is curved in the rotational direction of the conveyor belt is arranged left and right at constant intervals longitudinally on the rotating conveyor belt and the oil adsorption member attached to and detached from the conveyor belt, and the figure of further including a garbage size sensing unit capable of adjusting the height and spacing of the plurality of garbage-collecting hooks protruding to the outside according to the size of the garbage, in a solar boat for easy collection of spilled oil and garbage in accordance with one embodiment of the present disclosure.

According to FIG. 6, in the solar boat for easy collection of spilled oil and garbage in accordance with one embodiment of the present disclosure, the collection member 430 may have a structure in which a plurality of attachable and detachable garbage-collecting hooks that has a pointed end and that is curved in the rotational direction of the conveyor belt 410 is arranged left and right at constant intervals longitudinally on the rotating conveyor belt 410 and the oil adsorption member 420 attached to and detached from the conveyor belt, and by further including the garbage size sensing unit 900, the height and spacing of the plurality of garbage-collecting hooks protruding to the outside can be adjusted according to the size of the garbage sensed by the garbage size sensing unit 900.

If the garbage on the water approaching the lower front side of the conveyor belt 410 is deflected to the left and right by the water current, there is a problem that it cannot easily climb up the conveyor belt 410 and is difficult to collect. In order to solve such a problem, the collection member 430 may have the structure in which the plurality of attachable and detachable garbage-collecting hooks that has a pointed end and that is curved in the rotational direction of the conveyor belt 410 is arranged left and right at constant intervals longitudinally on the rotating conveyor belt 410. By having the plurality of attachable and detachable garbage-collecting hooks that has a pointed end and that is curved in the rotational direction of the conveyor belt 410 arranged left and right at constant intervals on the rotating conveyor belt 410, the plurality of garbage-collecting hooks moves to the front side in the water below the conveyor belt 410, and the plurality of garbage-collecting hooks moves to the rear side on the water above the conveyor belt 410. The plurality of garbage-collecting hooks emerges from below to above on the front side of the conveyor belt 410, and the plurality of garbage-collecting hooks descends from above to below on the rear side of the conveyor belt 410. That is, as the plurality of garbage-collecting hooks emerges from in the water to out of the water on the lower front side of the conveyor belt 410, the garbage on the water approaching the lower front side of the conveyor belt 410 is caught on the plurality of garbage-collecting hooks, and thus, it is possible to solve the problem that the garbage is deflected to the left and right by the water current, and as the garbage in the water is easily caught by the plurality of garbage-collecting hooks moving to the front side in the water below the conveyor belt 410, the garbage in the water present at a certain depth can also easily climb up the conveyor belt 410, and it is possible to solve the problem of difficulty in collecting underwater garbage.

According to FIG. 6, the solar boat for easy collection of spilled oil and garbage in accordance with one embodiment of the present disclosure may further include the garbage size sensing unit 900. The garbage size sensing unit 900 added to the solar boat for easy collection of spilled oil and garbage in accordance with one embodiment of the present disclosure is not particularly limited in its configuration or shape as long as it performs the function of sensing the size of garbage. The spacing between the plurality of garbage-collecting hooks protruding to the outside can be adjusted according to the size of the garbage on the water sensed by the added garbage size sensing unit 900. By increasing the spacing between the plurality of garbage-collecting hooks protruding to the outside if the size of the garbage sensed by the garbage size sensing unit 900 is large, and decreasing the spacing between the plurality of garbage-collecting hooks protruding to the outside if the size of the garbage sensed by the garbage size sensing unit is small, it is possible to proceed with garbage collection work tailored to the environment and control the amount of garbage collection. In addition, the height of the plurality of garbage-collecting hooks protruding to the outside can be adjusted according to the size of the garbage on the water sensed by the added garbage size sensing unit 900. By increasing the height of the plurality of garbage-collecting hooks protruding to the outside if the size of the garbage sensed by the garbage size sensing unit 900 is large, and decreasing the height of the plurality of garbage-collecting hooks protruding to the outside if the size of the garbage sensed by the garbage size sensing unit is small, it is possible to proceed with garbage collection work tailored to the environment and control the amount of garbage collection.

Figure 7:
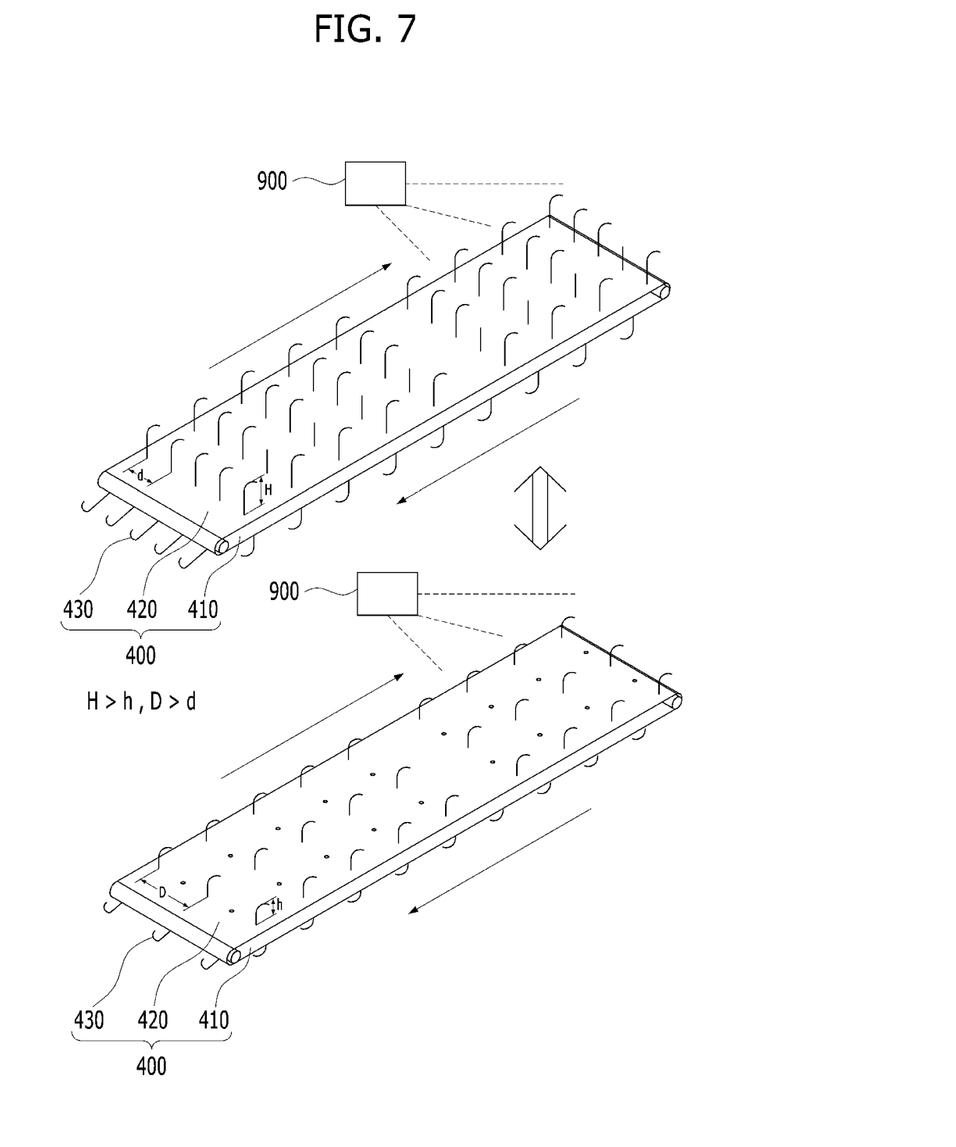
FIG. 7 is a diagram showing the figure of adjusting the spacing and height of a plurality of garbage-collecting hooks protruding to the outside according to the size of the garbage on the water in a solar boat for easy collection of spilled oil and garbage in accordance with one embodiment of the present disclosure.

FIG. 7 is a diagram showing the figure of adjusting the spacing and height of a plurality of garbage-collecting hooks protruding to the outside according to the size of the garbage on the water in a solar boat for easy collection of spilled oil and garbage in accordance with one embodiment of the present disclosure.

According to FIG. 7, in the solar boat for easy collection of spilled oil and garbage in accordance with one embodiment of the present disclosure, the spacing D and d and the height: H and h of the plurality of garbage-collecting hooks protruding to the outside may be adjusted according to the size of the garbage on the water. According to FIG. 6, by decreasing the spacing d between the plurality of garbage-collecting hooks protruding to the outside if the size of the garbage is small, and increasing the spacing D between the plurality of garbage-collecting hooks protruding to the outside if the size of the garbage is large, the amount of garbage collection can be adjusted. Further, according to FIG. 7, by decreasing the height h of the plurality of garbage-collecting hooks protruding to the outside if the size of the garbage is small, and increasing the height H of the plurality of garbage-collecting hooks protruding to the outside if the size of the garbage is large, the amount of garbage collection can be adjusted. According to FIG. 7, the plurality of garbage-collecting hooks protruding to the outside can be adjusted to protrude outside while having a width d and a height H as shown in the upper figure, or the plurality of garbage-collecting hooks protruding to the outside can be adjusted to protrude outside while having a width D and a height h as shown in the lower figure (D>d, H >h).

As set forth above, the present disclosure has been described with reference to the embodiments shown in the drawings, which are, however, merely illustrative, and it should be understood that various modifications and equivalent other embodiments are possible based on common knowledge in the art to which the present technology pertains. Therefore, the true technical protection scope of the present disclosure is based on the claims to be described below, and should be determined based on the specific contents of the disclosure set forth above.

INDUSTRIAL APPLICABILITY

The present disclosure relates to a solar boat for easy collection of spilled oil and garbage, and can be used in the industrial field of collecting spilled oil and waste on the water.

DESCRIPTION OF REFERENCE NUMERALS AND SYMBOLS

100: Cabin unit
200: Boat body
210, 220: A pair of ship bottoms
300: Solar panel unit
400: Collection and transfer unit
410: Conveyor belt
420: Oil adsorption member
430: Collection member
500: Garbage storage unit
600: Spilled oil storage unit
700: Steam spray nozzle
810: Water inlet
820: Filtration unit
830: Heating unit
840: Salinity measurement unit
850: Salinity adjustment unit
860: Solar panel cleaning unit
900: Garbage size sensing unit

What is claimed is:

1. A solar boat for easy collection of spilled oil and garbage, comprising: a cabin unit; a boat body consisting of a pair of ship bottoms having a structure that is symmetrical left and right and spaced apart below the cabin unit; a solar panel unit provided above the cabin unit and configured to convert solar energy into electrical energy; a collection and transfer unit provided between the pair of ship bottoms, driven by the electric energy supplied from the solar panel unit, and configured to collect spilled oil and garbage into the inside of the boat body; a garbage storage unit; and a spilled oil storage unit, wherein the collection and transfer unit comprises a rotating conveyor belt, and an oil adsorption member and a collection member that are attached to and detached from the conveyor belt; wherein an end of the conveyor belt further comprises a steam spray nozzle configured to separate the spilled oil from the oil adsorption member, the collection member, and the garbage by spraying hot steam, and to move the spilled oil to the spilled oil storage unit; wherein a front side of the pair of ship bottoms further comprises a water inlet configured to introduce water, the inside of the pair of ship bottoms further comprises a filtration unit configured to remove impurities from the water introduced during operation through the water inlet and a heating unit configured to heat the water from which impurities have been removed, and hot steam heated by the heating unit is ejected onto the oil adsorption member, the collection member, and the garbage through the steam spray nozzle, thereby performing a role of separating the spilled oil and moving it to the spilled oil storage unit; wherein the filtration unit further comprises a salinity measurement unit configured to measure the salinity of the water from which impurities have been removed and a salinity adjustment unit configured to adjust the salinity of the water from which impurities have been removed.

2. The solar boat for easy collection of spilled oil and garbage of claim 1, wherein the garbage storage unit is formed at the end of the conveyor belt and has a plurality of through holes of a certain size formed in a bottom thereof, thereby performing a function that the spilled oil falls downward and moves to the spilled oil storage unit and the garbage is filtered out.

3. The solar boat for easy collection of spilled oil and garbage of claim 1, further comprising a solar panel cleaning unit configured to proceed with a cleaning operation on the solar panel unit using the water whose salinity has been adjusted by the salinity adjustment unit.

4. The solar boat for easy collection of spilled oil and garbage of claim 1, wherein the collection member has a structure in which a plurality of attachable and detachable garbage-collecting hooks that has a pointed end and that is curved in a rotational direction of the conveyor belt is arranged left and right at constant intervals longitudinally on the conveyor belt and the oil adsorption member attached to and detached from the conveyor belt.

5. The solar boat for easy collection of spilled oil and garbage of claim 4, further comprising a garbage size sensing unit, so that a height and spacing of the plurality of attachable and detachable garbage-collecting hooks protruding outwardly outside is adjusted according to the size of the garbage sensed by the garbage size sensing unit.

\* \* \* \* \*